United States Patent [19]

Schöll

[11] 4,173,969
[45] Nov. 13, 1979

[54] LIGHT-PERMEABLE THERMAL INSULATION APPARATUS

[76] Inventor: Günter Schöll, Via Orselina 9, Locarno-Muralto, Switzerland, CH-660

[21] Appl. No.: 846,449

[22] Filed: Oct. 28, 1977

[30] Foreign Application Priority Data

Oct. 29, 1976 [DE] Fed. Rep. of Germany ....... 2649472

[51] Int. Cl.² ............................................... F24J 3/02
[52] U.S. Cl. .................................... 126/417; 65/108; 65/156; 52/306; 165/170
[58] Field of Search ................... 65/76, 77, 78, 82, 58, 65/108, 156; 52/306; 126/270, 271; 165/170

[56] References Cited

U.S. PATENT DOCUMENTS

| 1,342,404 | 6/1920 | D'Harlingue | 65/58 X |
| 1,413,169 | 4/1922 | Lawton | 65/58 X |
| 1,801,710 | 4/1931 | Abbot | 126/271 |
| 1,848,190 | 3/1932 | Morgan | 65/58 X |
| 1,868,236 | 7/1932 | Janzen | 65/58 X |
| 2,665,610 | 1/1954 | Harrison | 52/306 X |

FOREIGN PATENT DOCUMENTS

2514440 10/1976 Fed. Rep. of Germany ............. 52/306

*Primary Examiner*—Arthur D. Kellogg
*Attorney, Agent, or Firm*—Karl F. Ross

[57] ABSTRACT

A collector of solar energy comprises an array of contiguous transparent blocks, arranged in one or more layers or tiers, resting on a thermally conductive supporting plate which overlies a system of conduits for the circulation of a heat-carrying fluid such as water. Each block consists of a thin-walled hollow glass body of generally prismatic shape with a broad concave undersurface which, in the case of the lowest tier, makes only line contact with its supporting surface and is largely separated from that surface by an intervening dead-air space minimizing conductive heat transfer therebetween. A nipple at one end face, used for the blowing of the glass bodies, may be received in a complementary recess of a juxtaposed end face of an adjoining body.

17 Claims, 15 Drawing Figures

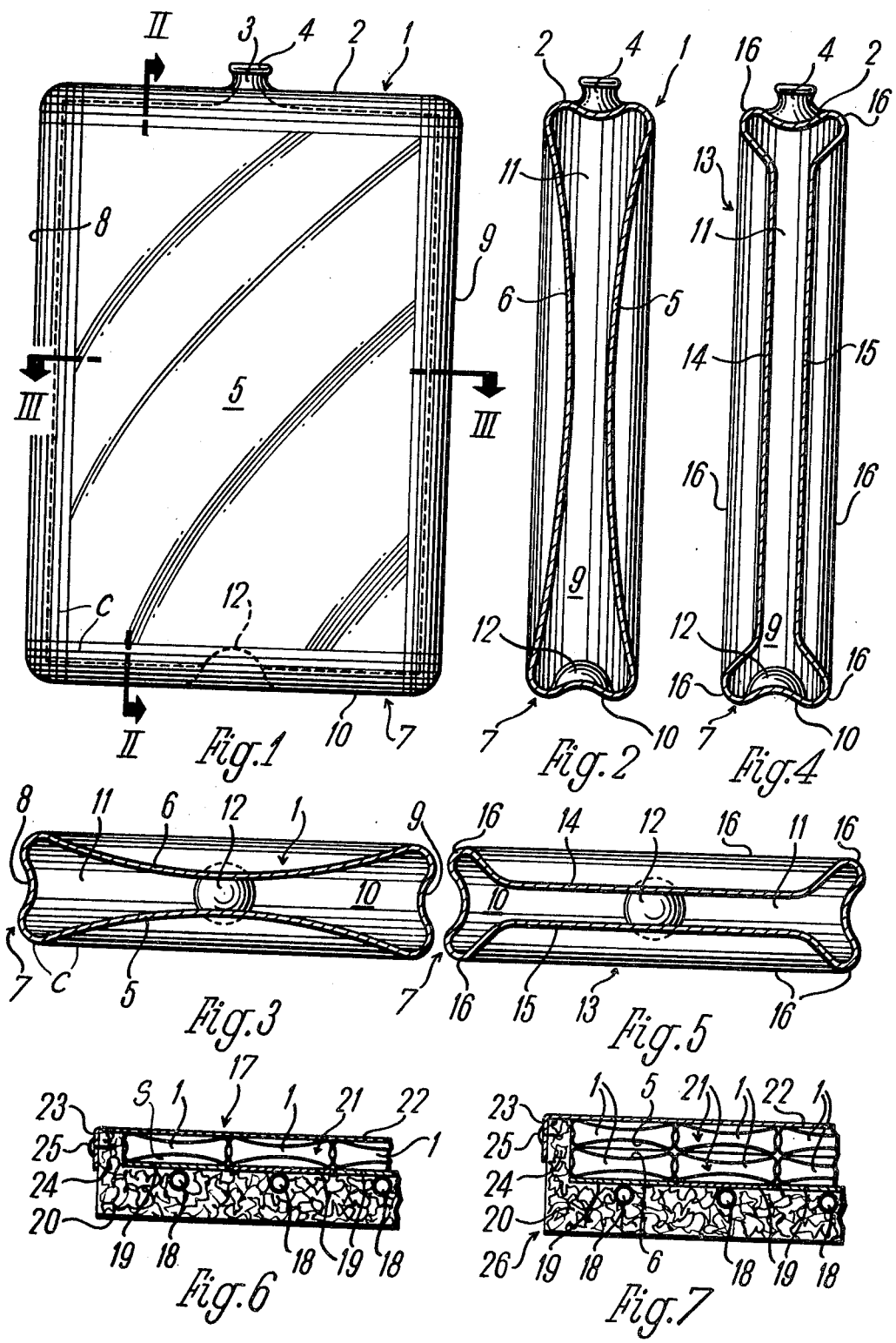

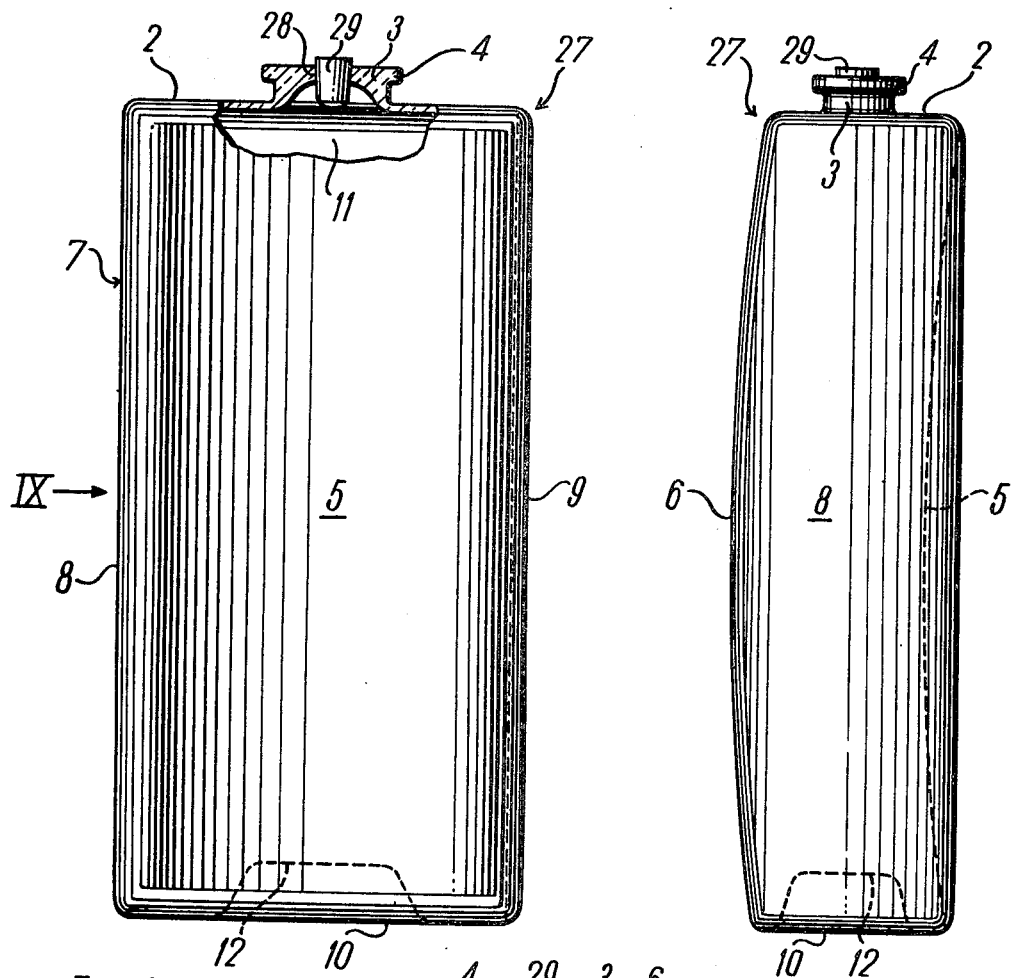
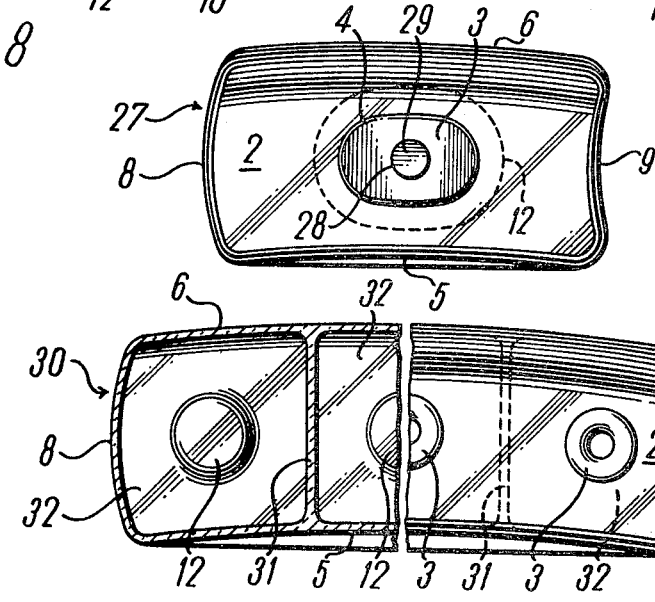
Fig.8  Fig.9  Fig.10  Fig.11

LIGHT-PERMEABLE THERMAL INSULATION APPARATUS

FIELD OF THE INVENTION

My present invention relates to a transparent heat-insulating body and, more particularly, to an assembly of such bodies facilitating one-way transmission of radiant energy such as sunlight.

BACKGROUND OF THE INVENTION

Transparent insulation has long been known and can comprise, in accordance with conventional practices, so-called double windows or multiple-pane window structures, as well as walls formed by glass blocks. These ligh-permeable thermally insulating structures can be used to supply daylight to workrooms and living quarters, but prevent the loss of heat therefrom. They have been found to have greater heat-lagging effectiveness than simple windows with single glass panes interposed between the external environment and the interior of the structure.

In recent years multiple-pane wall structures and windows have been provided for this purpose and, in addition, for the covering of planar solar-energy collectors so that the radiant energy from the sun can penetrate to the heat-absorbing surface but loss of heat by convection, reradiation and contact or conduction from this surface is precluded.

Multiple-pane transparent thermally insulating walls are satisfactory only as long as the differential between the temperature at the pane and the highest ambient temperature is relatively low. This is usually the case when the thermally insulating transparent structure forms part of a glass door or window in dwellings and work places.

However, when such a multiple-pane wall is used in conjunction with a solar-energy collector, numerous disadvantages are found to arise which have limited the desirability of such structures.

Thus, the pane of the glass wall closest to the energy-collecting surface is generally at an extremely high temperature which can be about 150° C. or more. As a result, this glass pane or the entire assembly of glass panes must be of special temperature-resistant or refractory glass. Fabricating the covering for a solar-energy collector from such special glasses has been found to be inordinately costly.

Generally, moreover, the outer glass pane is disposed in the collector not vertically but rather with an inclination to the vertical and hence is subject to high bending stresses because of the weight of the glass pane, snow loads, hail and other environmental effects. As has been learned from greenhouse construction, such stresses can only be taken up reliably by glass panes whose thickness is several millimeters, thereby increasing the weight of the glass pane and providing a greater thickness of glass which must be traversed by the solar energy. This has been found to increase the cost of solar-energy collectors and reduce the efficiency thereof. To overcome these disadvantages at least in part, it has been proposed to substitute for the silicate-glass panes foils or plates of a transparent or light-permeable synthetic resin. However, while all synthetic resins which can be used for this purpose have a substantially lower specific gravity than silicate glass and a high impact-bending strength, it has been found that such foils and plates, apart from those made from expensive glass-fiber-reinforced synthetic resins, have poor shape retentivity or stability at high temperatures and hence a low resistance to long-term exposure to elevated temperatures. Thus it is not possible or practical to use the synthetic resin directly adjacent the collector surface. Furthermore, the light transmissivity of such synthetic-resin foils is lower than that of glass.

There have already been suggestions for the covering of the absorber surface of a solar collector with glass blocks or the like. It has been the practice to design the glass blocks as half shells which are pressed from glass and are assembled into the closed hollow bodies. Because of the pressing process, however, these structural elements of glass have a great wall thickness and are relatively heavy. This again increases the size of the support structure which must be provided to carry the transparent thermal barrier. In addition, the light permeability or transmissivity of thick-walled glass elements is limited and such block have been found unsatisfactory for solar-energy collectors.

OBJECTS OF THE INVENTION

It is the principal object of my present invention to provide an improved hollow glass body which can be used as part of a light-transmitting thermally insulating wall.

A further object of the invention is to provide a transparent but thermally insulating wall structure adapted to serve as the cover for a solar-energy collector.

Yet another object of this invention is to provide an improved solar-energy collector which obviates disadvantages of earlier systems designed for this purpose.

SUMMARY OF THE INVENTION

These objects and others which will become apparent hereinafter are attained, in accordance with the present invention, with a hollow-silicate-glass-body of a wall thickness which can be of a millimeter or less and which is blown on a hollow glass blowing machine, i.e. a machine of the type which has heretofore been used to blow glass bottles. The hollow body is blown from the silicate glass and is shaped in a plurality of steps. Thus, the body is preblown and/or subjected to prepressing and is then given its final shape by a subsequent or finish-blowing operation. I prefer to make the configuration of this body like that of a rectangularly prismatic box having a pair of broad sides and four relatively narrow sides extending around the perimeter of the broad sides. All the sides of the box are integral and unitary with one another. According to an important feature of the invention, the sides are of curved profile or cross-section, i.e. are convex and/or concave.

When the hollow bodies are produced in the configuration and in the manner described, they advantageously are flat boxes which can be assembled in lateral and end contiguous relationship.

The box-shaped configuration of the hollow body is especially advantageous in that, with the curved-cross-section walls as described, the structure is stiffened and thereby strengthened to resist the stresses which normally may be applied to the heat-insulating transparent cover of a solar-energy collector or absorber.

At least the opposite broad-surface walls are given a slight curvature or doming according to the invention even though I prefer to provide all six walls with such curvature or arcuate profiles.

More particularly, at least one of the broad surfaces of each body or block is concave and bounded by a rounded ridge adapted to make only line contact with an adjoining flat surface such as a heat-collecting plate supporting an array of such blocks.

According to a particularly advantageous feature of the invention, one or each of the broad-surface walls is formed as a tray so that the periphery of this wall rises above the bottom thereof to form a rounded edge merging with the four adjacent relatively narrow walls constituting the edges of the generally prismatic body.

In order that the box-shaped hollow bodies can be disposed contiguously with a minimum of mutual slidability, I have found it advantageous to provide the opposite ends of the hollow body with mutually complementary male and female formations. More particularly, the male formation can be a neck or mouth through which the hollow body is blown while the female formation can be an inwardly bent portion of an opposite end wall adapted to receive the neck or mouth of the adjacent box-like body.

The opposite longitudinal walls of the body also can be mutually complementary, i.e. with one being outwardly convex while the other is outwardly concave, so that the convex wall of one body can engage in the concavity formed by the concave wall of an adjacent body and contiguous therewith.

This permits the hollow bodies to be brought together as close as possible and eliminates to a large extent, the clearances existing between the body. Any remaining interstices may be filled in with plugging material, if desired, to minimize convection within the layer of hollow bodies.

For example, one of the end walls of one of the hollow bodies may be provided with a corrugated profile parallel to the wall so that the crests of the corrugations of one body penetrate into the troughs of the corrugations in the opposite wall of an adjoining body.

Where the edges of the adjoining bodies would define air channels, these edges may be formed with projections which extend into the channels and limit the displacement of air therein. Of course, as noted, the interstices can be filled with plugs or the like.

The neck or mouth of the hollow body may be plugged to limit the penetration of moisture into that body and is usually of a smaller cross-section than the recess in which it is to be received.

When the hollow body must extend over a large area and be of relatively small wall thickness, I have found it advantageous to provide its interior with partitions or the like constituting strengthening ribs.

According to yet another feature of the invention, one end of each hollow body is open over the entire cross-section of the body and engages an outwardly projecting bottom portion of an adjoining hollow body. The projecting bottom defines a shoulder with the walls of this latter body and a sealing ring can be received between the end face of the first body and the projecting bottom of the second.

In this case, the projecting bottom of the second body forms a plug which sealingly closes the mouth of the first body.

The prismatic hollow bodies open at one end can be formed, during fabrication on the blowing machine, with diametrically opposite or rotation-symmetrical portions, e.g. projections, ribs or the like, to extend practically into contact with the corresponding ribs of an adjoining body.

The hollow bodies of the present invention can be disposed in a single layer to form a light-permeable wall, although I prefer to arrange them in at least two layers or tiers and to cover the layer or layers with a thin sheet or foil of transparent synthetic-resin material for protection from weather influences such as rain, snow and frost. Similar light-permeable sheets or foils can, of course, be disposed between the layers of the hollow bodies.

While the hollow bodies according to my present invention have been found to be particularly satisfactory for use as the insulating transparent layers of a solar collector, I have found them also to be practical for use as transparent insulating windows, doors or the like or between panes of such doors or windows. The hollow bodies form layers with an extremely high heat-lagging effect and a particularly high light transmissivity, while being of low weight and having considerable strength.

BRIEF DESCRIPTION OF THE DRAWING

The above and other objects, features and advantages of the present invention will become more readily apparent from the following description, reference being made to the accompanying drawing in which:

FIG. 1 is a side-elevational view of a box-shaped hollow body adapted to form part of a transparent thermal barrier according to the invention;

FIG. 2 is a section taken along the line II—II of FIG. 1;

FIG. 3 is a section taken along the line III—III of FIG. 1;

FIGS. 4 and 5 are cross-sectional views illustrating another embodiment of the invention and corresponding to the views of FIGS. 2 and 3, respectively;

FIG. 6 is a partial cross-section view, somewhat in diagrammatic form, of a solar-energy collector using the transparent heat-insulating assembly according to the invention;

FIG. 7 is a view similar to FIG. 6 illustrating another solar collector according to my invention;

FIG. 8 is a side-elevational view (corresponding to the view of FIG. 1 but partially broken away) of a box-shaped hollow body according to another embodiment of the invention;

FIG. 9 is a front-elevational view of the structure of FIG. 8 taken in the direction of the arrow IX thereof;

FIG. 10 is an end view of the hollow body of FIGS. 8 and 9;

FIG. 11 is a view, similar to FIG. 10 but partly broken away, of a hollow body having generally the configuration of that of FIGS. 8–10 but subdivided internally into three compartments;

SPECIFIC DESCRIPTION

Figure 12:
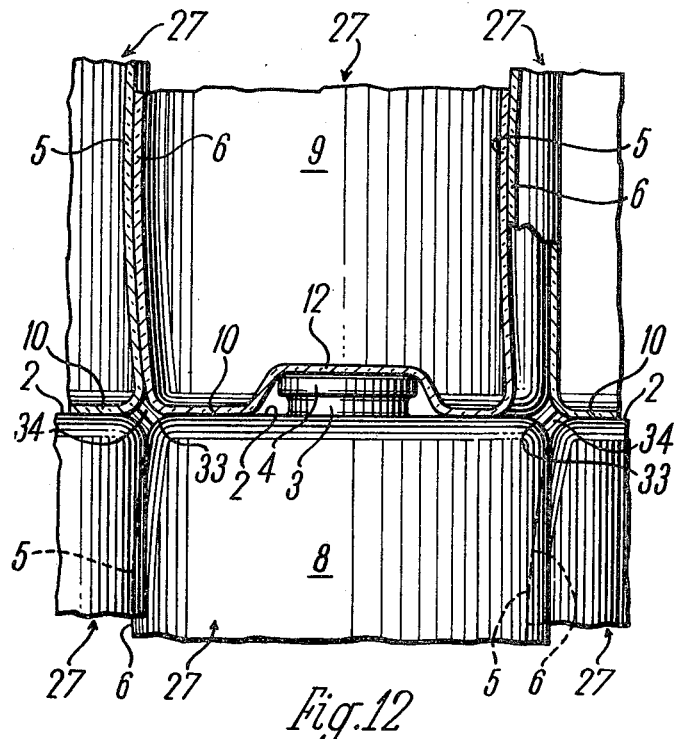
FIG. 12 is a cross-sectional detail view of the interengaging portions of adjacent hollow bodies according to the invention, partly broken away.

FIG. 1 shows a completed box-shaped hollow body 1, composed of silicate glass, having an upper end wall 2 formed with an upwardly open neck 3 which has been used as a nipple to blow the structure on a conventional glass-blowing machine of the type used for the manufacture of glass bottles. The mouth at the upper end of this neck is surrounded by an outwardly projecting rim 4.

As can be seen especially from FIGS. 2 and 3, the large-area opposite faces 5 and 6, as well as the long sides 8 and 9 which are relatively narrow, the bottom 10, and the top 2, bulge arcuately inwardly, i.e. are inwardly convex or outwardly concave, the bulging surfaces being turned toward the center of the structure. This imparts to the box-shaped body 1 a high degree of stiffness.

The bottom or the lower end wall 10 of the box is formed with an inwardly deflected portion 12 forming an outwardly open concavity adapted to receive the neck 3 and the rim 4 of an adjoining hollow body 1 when two such bodies are assembled in contiguous relationship to form a solar collector.

The edges interconnecting the relatively narrow sides 2, 8, 9, 10, and the edges connecting these sides with the broad faces 5 and 6 are outwardly convex and curved in cross-section. Similarly, the corners of the box-like structure are rounded so as to be outwardly convex.

FIGS. 4 and 5 show a similar box-like structure in which the opposite broad surfaces 14 and 15, instead of being inwardly curved, are generally planar but recessed.

Thus, the broad lateral faces 14 and 15 of the hollow body 13 have a tray-shaped configuration with an outwardly convex edge 16 extending all around the perimeter of the planar surfaces 14 and 15 and forming a transition between these planar surfaces and the sides 2 and 8–10. In this embodiment as well, a recess 12 is provided in which the mouth portion 3, 4 of an adjacent hollow body 13 can be received.

In the formation of a solar-energy collector according to the invention, as represented in FIG. 6 in which the collector is shown in a partial diagrammatic cross-section, the solar collector 17 is provided with the usual heat-collecting tubes 18 which can be traversed by water or some other heat carrier. These tubes 18 are affixed on the underside of a thermally conductive collector plate 19 whose upper surface may be blackened in the usual manner in increase the absorption of sunlight and minimize outward radiation of heat. The tubes 18 project into a mass of foamed insulating material as represented diagrammatically, received within an upwardly open box-shaped housing 20. Above the collector plate 19, there is disposed an array of thermally insulating transparent hollow bodies 1 composed of glass to form a contiguous layer 21. Overlying this layer is a transparent thin synthetic-resin foil 22 whose edges 23 are turned over the sides of the box and are secured thereto by rivets, clamps or the like. Typical fastening means for this purpose can include pins, buttons or the like disposed on the upstanding edge 24 of the housing.

FIG. 7 shows a similar construction of a solar collector 26 wherein, however, two layers or tiers 21 of the hollow bodies 1 (or 13) are provided.

Because of the tray configuration of the broad surfaces 5, 6 or 14, 15 of the hollow bodies 1 or 13, trapped-air compartments are formed between them and between each layer 21 and the plate 19 therebelow or the foil 22 thereabove. The remaining elements of the structure shown in FIG. 7 have been described previously.

FIGS. 8–10 show another advantageous embodiment of the invention comprising a hollow body 27 composed of silicate glass. In this case, the upper end face 2 and the lower end face 10 are planar and not inwardly convex as has been described for the embodiments of FIGS. 1–7. However, the broad surfaces 5 and 6 are respectively outwardly concave and outwardly convex with complementary curvatures so that each hollow body can be stacked flush with an underlying or overlying similar body.

Also the longitudinal side walls 8 and 9 are respectively outwardly convex and outwardly concave with complementary curvatures so that laterally contiguous hollow bodies can fit into one another. This interfitting relationship can be seen readily from FIG. 12 which also makes clear the fact that practically no spaces are left between the bodies.

The bottom end face 10 is provided with a downwardly open recess 12, formed by an inwardly bulging portion of this end face, the recess being adapted to receive the mouthpiece 3, 4 of the neighboring hollow body 12 formed on its upper end face 2. The opening 28 of the neck 3, as is also the case with the embodiments of FIG. 1–7 and those described hereinafter, can be closed by a plug 29 to prevent penetration of moisture into the interior 11 of the hollow body 27 and condensation on the inner surfaces thereof.

In all the Figures of the drawing, similarly functioning or corresponding parts have been identified by the same reference numeral for all embodiments.

FIG. 11 illustrates a modification of the structure of FIGS. 8–10 wherein the interior of the hollow body 30 is subdivided by unitary partitions 31 into three compartments, each of which can be blown through a respective neck 3 and is formed with a respective concavity 12, the concavities receiving the necks of an adjoining hollow body of similar shape.

The partitions 31 function to further strengthen the hollow body against inward deformation and deflection.

As will be apparent from FIG. 12, in the region of the corners of the layer interstices are formed between the laterally and endwise contiguous hollow bodies 27. These interstices can be filled with plugs 34 of synthetic resin which can be cast in place or forced into the interstices provided that these plugs are of soft material. These plugs limit or stop the exchange of air within the insulating layer and also prevent moisture from penetrating into the layer or through the latter.

Figure 13:
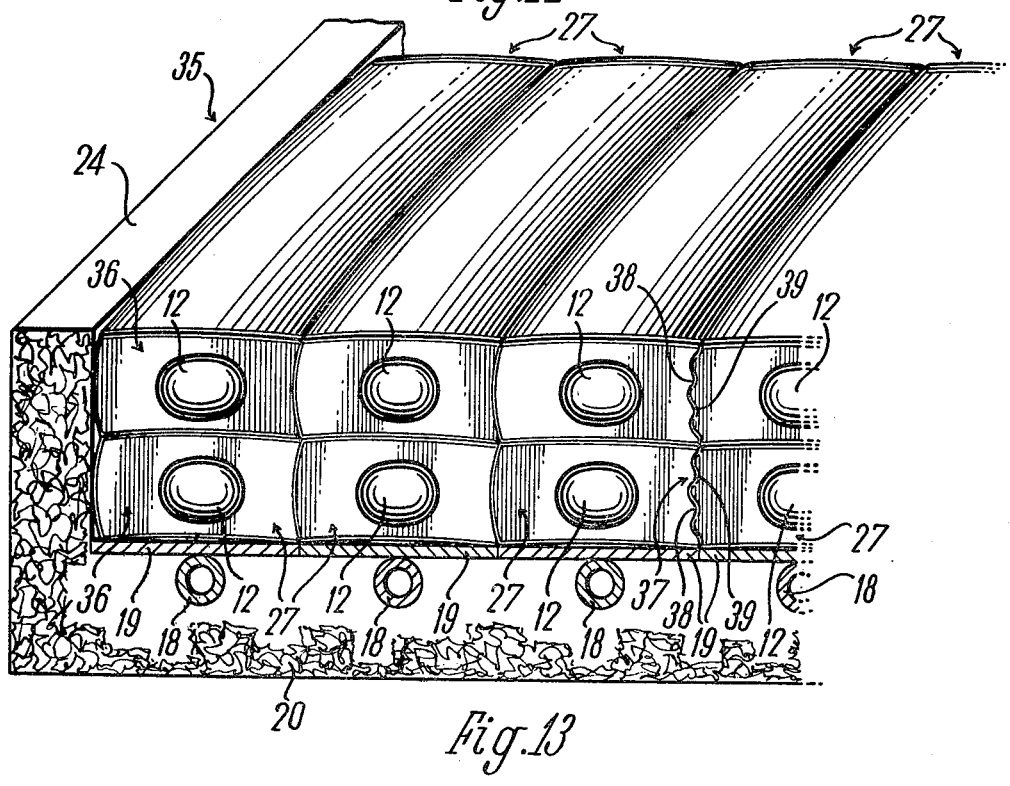
FIG. 13 is a partial section of a solar collector, illustrated in a perspective view, using the hollow bodies of FIGS. 8–11 and other hollow bodies constituting a slight modification thereof.

FIG. 13 shows, in a manner similar to that illustrated in FIG. 7, the cross-section of a solar collector 35 which includes two layers or tiers 36 of hollow bodies 27 of the type previously described in connection with FIGS. 8–10 and 12.

While the interfitting relationship of the hollow bodies is clear from FIG. 13, it also will be apparent that the interengaging lateral faces of the bodies may be formed with other curved contours as, for example, the corrugated contours 38, 39 which have been shown for the four side walls 37 in FIG. 13. In this case, the ribs 38 or crests of the corrugations can be received within the grooves or troughs 39 thereof.

Figure 14:
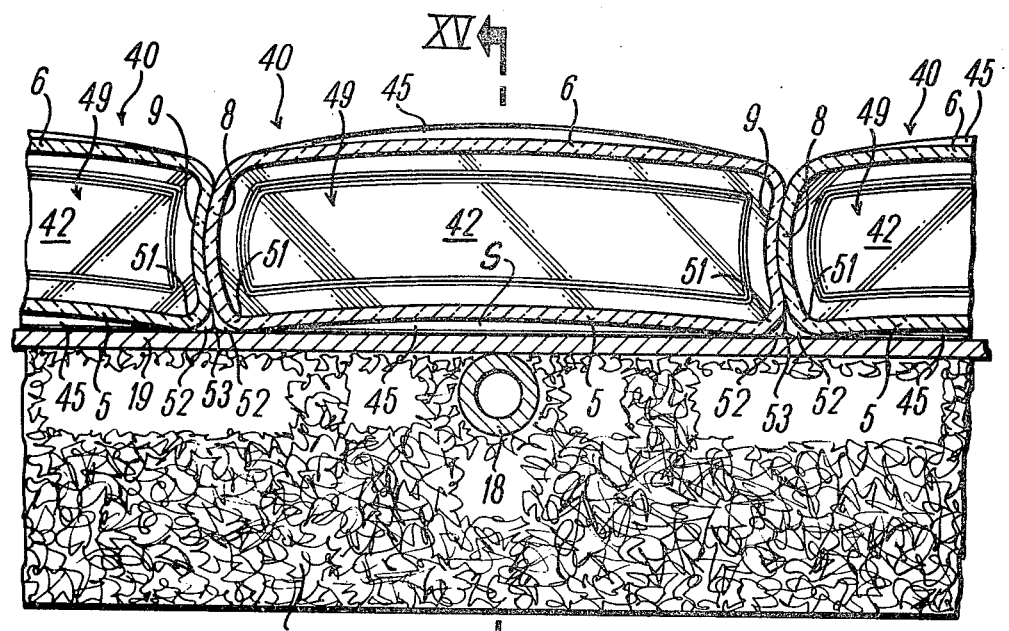
FIG. 14 is a partial cross-sectional view enlarged as is the view of FIG. 13 but showing still another embodiment of the present invention as applied to a solar collector.
Figure 15:
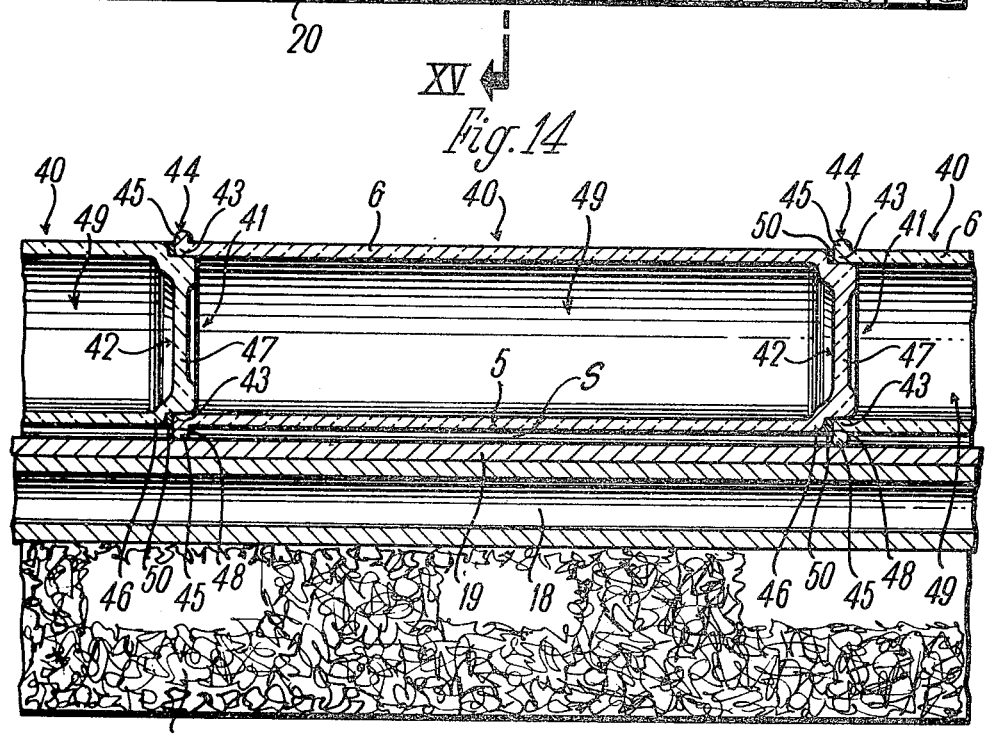
FIG. 15 is a cross-sectional view through the latter solar collector taken along the line XV—XV of FIG. 14.

Yet another embodiment of the invention will be apparent from FIGS. 14 and 15 of the drawing in which again the layer of transparent members overlying the collector plate 19 is composed of domed-wall hollow bodies 40 in laterally interfitting and interengaging relationship. In this case, however, one end of each of the bodies is fully open as shown at 41 and has a periphery 43 surrounded by a rib or bead 45. This open end 41 of one hollow body fits snugly around a projecting part 47 of an end wall 42 of the adjoining body to form therewith a joint 44. Wall portion 47 is drawn out during the blowing process. A shoulder 46 is formed between the projecting end 47 and the remainder of the hollow body, i.e. the broad walls 5, 6 and the side walls 8, 9 thereof, and a sealing ring 50 is clamped between the shoulder 46 and the rim or end face 48 of the adjoining hollow body to help close off its interior 49.

As is also apparent from FIG. 14, in the region of their outer longitudinal edges 51, the hollow bodies 40 are provided with projections 52 which extend into the clearances existing between adjacent hollow bodies 40 as represented at 53 and create dead-air spaces therein to prevent the convective movement of air and resulting thermal exchanges.

As will be apparent from the drawing, the curved undersurface of each glass body or block is free from discontinuities and forms a substantially rectangular, narrow line of contact C (FIGS. 1 and 3) by which it can rest on an underlying supporting surface, such as the collector plate 19 of FIGS. 6 and 7, at locations spaced inwardly from sidewalls 8, 9 and with formation of a shallow dead-air space S therebetween minimizing the rate of heat conduction. In the embodiment of FIGS. 14 and 15 this line of contact extends only along three sides of the body 40, i.e. at its rounded lateral edges 51 (also spaced inwardly from sidewalls 8, 9) and at the end provided with the likewise rounded peripheral bead 45. With symmetrically concave bodies 1 as shown in FIGS. 1-7, similar lines of contact enclosing dead-air spaces exist also between a tier of such bodies and an overlying foil 22.

I claim:
1. In a collector of solar energy, in combination:
a heat-conductive plate forming a flat supporting surface; and
a two-dimensional array of substantially identical contiguous transparent blocks carried on said supporting surface, each of said blocks being a thin-walled hollow glass body of generally prismatic configuration with a broad lower surface, a broad upper surface and four narrower sides formed in part by a pair of opposite sidewalls, said lower surface being concave and free from discontinuities and being mounted on at least three sides by a rounded ridge, at least some of said blocks resting directly on said plate with said ridge making line contact with said supporting surface at locations spaced inwardly from said sidewalls and encompassing a shallow dead-air space separating said lower surface from said supporting surface.
2. The combination defined in claim 1 wherein said body has a wall thickness on the order of a millimeter.
3. The combination defined in claim 1 wherein said broad surfaces are symmetrically concave.
4. The combination defined in claim 1 wherein said broad upper surface is convex with a curvature complementary to that of said broad lower surface.
5. The combination defined in claim 1 wherein said body has two end walls transverse to said sidewalls, one of said end walls being provided with a nipple and the other end wall being provided with a recess adapted to accommodate the nipple of an adjoining body.
6. The combination defined in claim 1 wherein said body is provided with at least one internal partition perpendicular to said broad surfaces.
7. The combination defined in claim 1 wherein said body consists of silica glass.
8. The combination defined in claim 1 wherein said blocks are stacked on said plate in a plurality of tiers.
9. The combination defined in claim 1, further comprising a transparent foil overlying said array.
10. The combination defined in claim 9 wherein the blocks in contact with said foil have concave upper surfaces forming dead-air spaces between themselves and said foil.
11. The combination defined in claim 10 wherein the concavities of said upper and lower surfaces are symmetrical.
12. The combination defined in claim 1 wherein adjoining blocks are separated by clearances adjacent said supporting surface, said blocks being provided with projections extending into said clearances for inhibiting the circulation of air therethrough.
13. The combination defined in claim 1 wherein said sidewalls of adjoining blocks are in full-face contact with each other.
14. The combination defined in claim 13 wherein said sidewalls of each block are complementarily concave and convex, respectively.
15. The combination defined in claim 1 wherein said blocks each have an open end and an opposite closed end, said closed end forming a projecting portion closely fitting into the open end of an adjoining block, said projecting portion being surrounded by a transverse shoulder confronting the rim of the open end of the adjoining block, further comprising a sealing ring embracing said projecting portion and separating said shoulder from said rim.
16. The combination defined in claim 15 wherein said open end is surrounded by a peripheral bead whose lower portion forms part of said ridge.
17. The combination defined in claim 1 wherein said supporting surface is blackened.

* * * * *